US012473750B2

(12) United States Patent
Tang et al.

(10) Patent No.: US 12,473,750 B2
(45) Date of Patent: Nov. 18, 2025

(54) PASSWORD-RETRIEVING APPARATUS FOR CODED LOCK

(71) Applicant: WENZHOU JINJIAN SMART LOCK CO., LTD, Wenzhou (CN)

(72) Inventors: Ren Tang, Wenzhou (CN); Zhimin Ye, Wenzhou (CN)

(73) Assignee: WENZHOU JINJIAN SMART LOCK CO., LTD, Wenzhou (CN)

( * ) Notice: Subject to any disclaimer, the term of this patent is extended or adjusted under 35 U.S.C. 154(b) by 101 days.

(21) Appl. No.: 18/531,705

(22) Filed: Dec. 7, 2023

(65) Prior Publication Data

US 2024/0125144 A1 Apr. 18, 2024

Related U.S. Application Data

(63) Continuation of application No. PCT/CN2023/079702, filed on Mar. 4, 2023.

(30) Foreign Application Priority Data

May 13, 2022 (CN) ........................ 202221172199.2

(51) Int. Cl.
*E05B 37/02* (2006.01)

(52) U.S. Cl.
CPC .................................... *E05B 37/02* (2013.01)

(58) Field of Classification Search
CPC ...... E05B 37/02; E05B 37/12; E05B 37/0048; E05B 17/22; Y10T 70/7305
USPC .................................... 70/312, 446, DIG. 44
See application file for complete search history.

(56) References Cited

U.S. PATENT DOCUMENTS

2010/0300163 A1* 12/2010 Loughlin ........... G07C 9/00896 70/333 R

FOREIGN PATENT DOCUMENTS

| | | | | | |
|---|---|---|---|---|---|
| CN | 1434184 | A | * | 8/2003 | ........... E05B 1/0092 |
| CN | 204609512 | U | * | 9/2015 | ......... E05B 37/0034 |
| CN | 107780712 | A | * | 3/2018 | ......... E05B 37/0041 |
| CN | 112627639 | A | * | 4/2021 | |
| CN | 113153002 | A | * | 7/2021 | ............. E05B 15/00 |
| CN | 113503092 | A | * | 10/2021 | |
| CN | 216517384 | U | | 5/2022 | |
| CN | 219365699 | U | | 7/2023 | |
| WO | WO-2022061623 | A1 | * | 3/2022 | |

* cited by examiner

*Primary Examiner* — Suzanne L Barrett
(74) *Attorney, Agent, or Firm* — Nitin Kaushik

(57) ABSTRACT

Password-retrieving-apparatus for coded lock, a movable adjusting rod is arranged in the lock body; a small spring is arranged between the adjusting rod and a lock cover; the adjusting rod is provided with a protruding point; an inner wheel is provided with an avoidance clamping slot and a limit; a lock cylinder is driven to rotate under the rotation of a spare key; the lock cylinder is engaged with a bump on a toggling disk for driving the inner wheel to rotate in a staggered manner; the lock body moves relatively under the action of a big spring; the adjusting rod moves inwards under the action of the small spring; and the toggling disk is rotated to drive the inner wheel to rotate; the protruding point on the adjusting rod and the limit in the inner wheel are clamped.

3 Claims, 4 Drawing Sheets

PASSWORD-RETRIEVING APPARATUS FOR CODED LOCK

CROSS-REFERENCE TO RELATED APPLICATIONS

The application claims priority to Chinese patent application No. 202221172199.2, filed on May 13, 2022, the entire contents of which are incorporated herein by reference.

TECHNICAL FIELD

The present invention relates to the technical field of coded locks, and in particular to a password-retrieving apparatus for a coded lock.

BACKGROUND

In an existing coded lock, sometimes the password is forgotten, the operation of trying to retrieve the password is complicated, and the lock cannot be unlocked for a while and only can be unlocked through professional unlocking, which wastes time, pays money and is not safe. How to retrieve the password without the help of professional unlocking personnel is a technical problem to be solved urgently.

SUMMARY

An objective of the present invention is to provide a password-retrieving apparatus for a coded lock, thereby solving the technical problem in the prior art.

According to the above objective, the basic technical solution of the present invention is: a password-retrieving apparatus or a code lock includes a lock body, where a combined body of an elastic wheel and an inner wheel is arranged outside the lock body, and is mounted between a lock shell and a lock cover through a big spring; the lock body is connected to a lock handle; a lock cylinder is arranged in the lock handle; a movable adjusting rod is arranged in the lock body; a small spring is arranged between the adjusting rod and a lock cover; the adjusting rod is provided with a protruding point; the inner wheel is provided with an avoidance clamping slot and a limit; the lock cylinder is driven to rotate under the rotation of a spare key; the lock cylinder is engaged with a bump on a toggling disk for driving the inner wheel to rotate in a staggered manner; the lock body moves relatively under the action of a big spring; the adjusting rod moves inwards under the action of the small spring; and the toggling disk is rotated to drive the inner wheel to rotate; as this time, an elastic wheel sleeved outside the inner wheel does not rotate; the protruding point on the adjusting rod and the limit in the inner wheel are clamped; and a password displayed on a password wheel outside the inner wheel is the retrieved password.

Further, the avoidance clamping slot is formed inside the elastic wheel; and the lock body is slidingly engaged with the avoidance clamping slot of a combined body of the inner elastic wheel and the inner wheel through the bump.

Further, a bump is arranged outside the inner wheel; the elastic wheel is provided with a clamping slot; and the inner wheel is nested with the clamping slot in the elastic wheel through the bump.

Further, a lock pin is arranged between the lock cylinder and the lock handle; and the lock cylinder and the lock handle are driven by the lock pin to rotate mutually.

Compared with the prior art, the advantages and the beneficial effects of the present invention are:

1. the product of the present invention can retrieve the password to solve the problem that it is easy to forget the password and prone to messy code in the password wheel;
2. the product of the present invention is simple to operate and can retrieve a correct password by inserting a spare key, rotating a lock cylinder and rotating the password wheel until rotation stops without any other requirements; and
3. the product of the present invention is simple in structure and low in cost, excessive parts and parts with the complicated processing process are not added, the whole assembling is simple, and no excessive cost is increased on the original basis.

Figure 1:
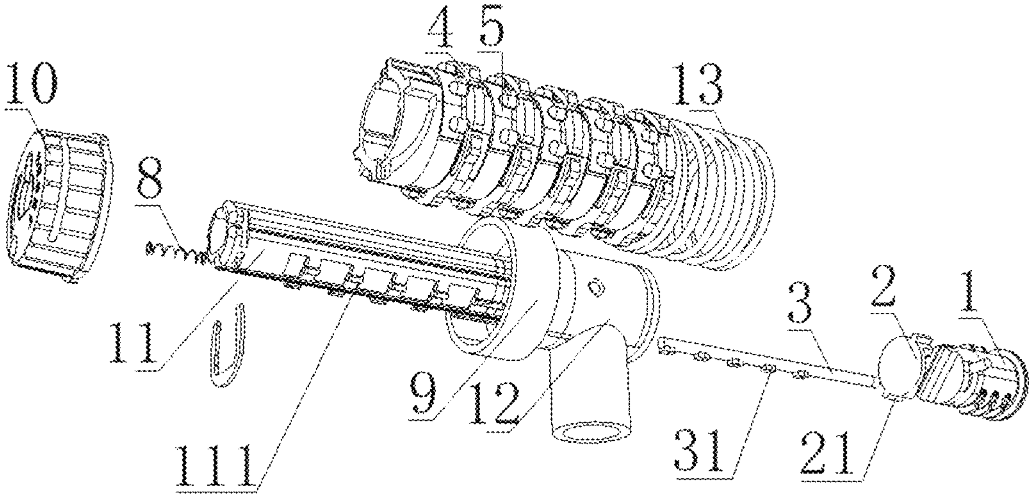
FIG. 1 is a schematic diagram of a discrete line body structure of a product according to the present invention.

In the drawings: 1. lock cylinder; 2. toggling disk; 3. adjusting rod; 4. elastic wheel; 5. inner wheel; 6. avoidance clamping slot; 7. limit; 8. small spring; 9. lock shell; 10. lock cover; 11. lock body; 12, lock handle; 13, big spring.

DETAILED DESCRIPTION OF THE EMBODIMENTS

Figure 2:
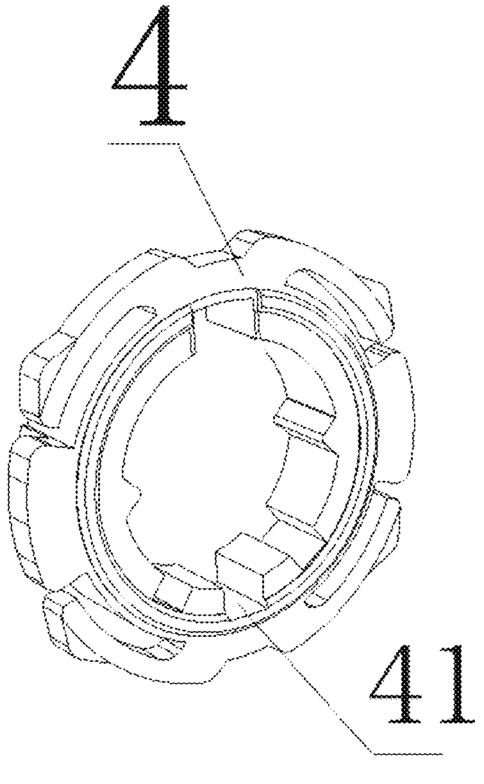
FIG. 2 is a schematic diagram of a line body structure of an elastic wheel of a product according to the present invention.
Figure 3:
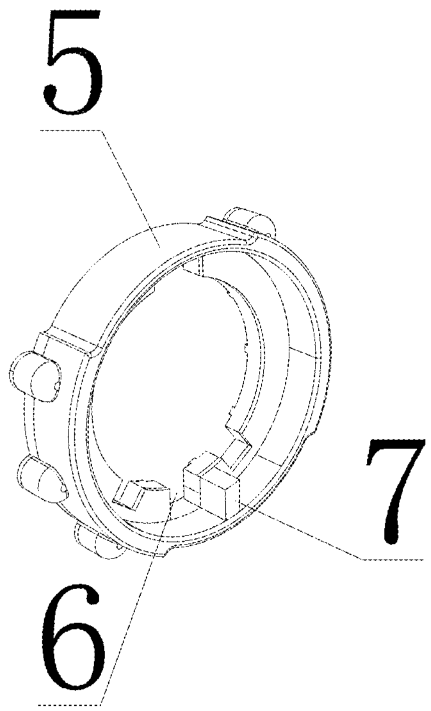
FIG. 3 is a schematic diagram of a line-frame structure of an inner wheel of a product according to the present invention.
Figure 4:
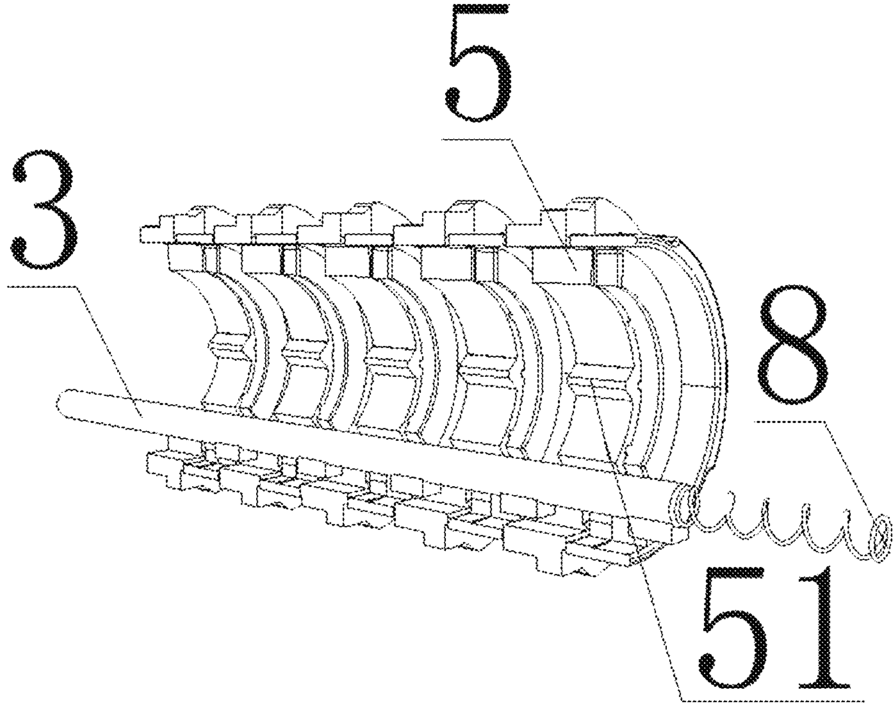
FIG. 4 is a schematic diagram of a line-frame structure of an adjusting rod in an inner wheel of a product according to the present invention.

Referring to FIG. 1 to FIG. 4, which are schematic diagrams of principle structures of a password-retrieving apparatus for a coded lock of an embodiment product according to the present invention. The password-retrieving apparatus for a coded lock includes a lock body 11, where a combined body of an elastic wheel 4 and an inner wheel 5 is arranged outside the lock body 11, and is mounted between a lock shell 9 and a lock cover 10 through a big spring 13; the lock body 11 is connected to a lock handle 12; a lock cylinder 1 is arranged in the lock handle 12; a movable adjusting rod 3 is arranged in the lock body 11; a small spring 8 is arranged between the adjusting rod 3 and the lock cover 10; the adjusting rod 3 is provided with a protruding point; the inner wheel 5 is provided with an avoidance clamping slot 6 and a limit 7; the lock cylinder 1 is driven under the rotation of the inner wheel 5 to rotate; the lock cylinder 1 is engaged with a bump on a toggling disk 2 for driving the inner wheel 5 to rotate in a staggered manner; the lock body 11 moves relatively under the action of the big spring 13; the adjusting rod 3 moves inwards under the action of the small spring 8; the toggling disk 2 is rotated to drive the inner wheel 5 to rotate; at this time, the elastic wheel 4 sleeved outside the inner wheel 5 does not rotate; the protruding point on the adjusting rod 3 and the limit 7 in the inner wheel 5 are not clamped; a password displayed on a password wheel outside the inner wheel 5 is the retrieved password; an avoidance clamping slot 6 is formed inside the elastic wheel 4; the lock body 11 is slidingly engaged with the avoidance clamping slot 6 of the combined body of the elastic wheel 4 and the inner wheel 5 through the bump; a bump is arranged outside the inner wheel 5; the elastic wheel 4 is provided with a clamping slot; the inner wheel 5 is nested with the clamping slot in the elastic wheel 4 through the bump; a lock pin is arranged between the lock cylinder 1 and the lock handle 12; and the lock cylinder and the lock handle are driven by the lock pin to rotate mutually.

A space is released by rotating the lock cylinder 1, so that the adjusting rod 3 has a space to move inwards; the small spring 8 is arranged at the bottom of the adjusting rod 3, so that the protrusion on the adjusting rod 3 is clamped into the inner wheel 5; and during retrieval of the password and in a case that the password is correct, the protruding point on the adjusting rod 3 clamps the limit 7 of the inner wheel 5, thereby causing the password wheel to be unable to rotate and retrieving a correct password.

The password-retrieving apparatus for a coded lock provided by the present invention is described above. In the description, the principle and implementation manner of the present invention are described by using the specific preferred embodiments. These embodiments are only used to help understand the principle and core idea of the present invention. It should be noted that for those of ordinary skill in the art, the implementation solutions in the above embodiments may be further combined or replaced without departing from the design idea of the present invention, and several improvements and modifications may be made to the present invention. These improvements and modifications also fall into the protection scope of the claims of the present invention.

What is claimed is:

1. A password-retrieving apparatus for a coded lock, comprising a lock body (11), wherein a combined body of an elastic wheel (4) and an inner wheel (5) is arranged outside the lock body (11), and is mounted between a lock shell (9) and a lock cover (10) through a big spring (13); the lock body (11) is connected to a lock handle (12); a lock cylinder (1) is arranged in the lock handle (12); a movable adjusting rod (3) is arranged in the lock body (11); a small spring (8) is arranged between the adjusting rod (3) and a lock cover (10); the adjusting rod (3) is provided with a protruding point (31); the inner wheel (5) is provided with an avoidance clamping slot (6) and a limit (7); the lock cylinder (1) is driven to rotate under the rotation of a spare key; the lock cylinder (1) is engaged with a first bump (21) on a toggling disk (2) for driving the inner wheel (5) to rotate in a staggered manner; the lock body (11) moves relatively under the action of a big spring (13); the adjusting rod (3) moves inwards under the action of the small spring (8); and the toggling disk (2) is rotated to drive the inner wheel (5) to rotate; when the inner wheel (5) is rotating drived by the toggling disk (2), an elastic wheel (4) sleeved outside the inner wheel (5) does not rotate; the protruding point on the adjusting rod (3) and the limit (7) in the inner wheel (5) are clamped; and a password displayed on a password wheel outside the inner wheel (5) is the retrieved password.

2. The password-retrieving apparatus for a coded lock according to claim 1, wherein clamping slot (41) is formed inside the elastic wheel (4); and the lock body (11) is slidingly engaged with the avoidance clamping slot (6) of a combined body of the inner elastic wheel (4) and the inner wheel (5) through a second bump (111).

3. The password-retrieving apparatus for a coded lock according to claim 1, wherein a third bump (51) is arranged outside the inner wheel (5); the elastic wheel (4) is provided with a clamping slot (41); and the inner wheel (5) is nested with the clamping slot (41) in the elastic wheel (4) through the third bump (51).

* * * * *